(12) United States Patent
Campau

(10) Patent No.: US 8,021,093 B2
(45) Date of Patent: Sep. 20, 2011

(54) LOCKING THREADED FASTENER

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 223 days.

(21) Appl. No.: 12/425,711

(22) Filed: Apr. 17, 2009

(65) Prior Publication Data

US 2010/0266364 A1    Oct. 21, 2010

(51) Int. Cl.
*F16B 37/12*    (2006.01)
(52) U.S. Cl. ...... 411/252; 411/255; 411/438; 411/929.1
(58) Field of Classification Search .................. 411/252, 411/262, 255, 438, 929.1, 981
See application file for complete search history.

(56) References Cited

U.S. PATENT DOCUMENTS

| | | | | |
|---|---|---|---|---|
| 1,017,845 A | * | 2/1912 | Brown | 411/252 |
| 1,630,958 A | * | 5/1927 | Mauch | 411/252 |
| 2,587,560 A | * | 2/1952 | Widmer | 411/231 |
| 3,391,720 A | | 7/1968 | Morse | |
| 3,565,149 A | | 2/1971 | Wetzel | |
| 3,589,423 A | * | 6/1971 | Metz | 411/262 |
| 3,701,372 A | | 10/1972 | Breed | |
| 4,692,078 A | * | 9/1987 | Dessouroux | 411/231 |
| 4,983,085 A | | 1/1991 | Gray | |
| 5,449,259 A | * | 9/1995 | Clohessey | 411/262 |
| 5,529,348 A | | 6/1996 | Wasserman et al. | |

FOREIGN PATENT DOCUMENTS

| | | |
|---|---|---|
| AT | 375452 | 8/1984 |
| EP | 1760334 | 3/2007 |
| FR | 2544030 | 10/1984 |
| GB | 221456 | 9/1924 |

OTHER PUBLICATIONS

United States Statutory Invention Registration No. H1588, published Sep. 3, 1996, entitled "Helical Spring Fastener".
PCT Notification of Transmittal of the International Search Report and the Written Opinion of the International Searching Authority, or the Declaration; International Search Report; Written Opinion of the International Searching Authority, dated May 21, 2010 in PCT Application No. PCT/US2010/026196.

(Continued)

*Primary Examiner* — Gary Estremsky
(74) *Attorney, Agent, or Firm* — Warner Norcross & Judd LLP

(57) ABSTRACT

The specification discloses a locking threaded fastener including a body, a coil spring, and a compression ring. The body is hex-shaped and defines a partially threaded bore, an external circumferential groove, and a passage extending radially between the bore and the groove. The coil spring is located within the bore and includes a first end angularly fixed with respect to the body and a second end extending through the passage and into the groove. The compression ring is located within the groove and defines an opening receiving the second end of the coil spring. The compression ring is free to move within the groove and includes portions that extending radially outwardly beyond the flats of the hex shape. When a conventional wrench is engaged with the hex shape, the wrench compresses the compression ring to prevent relative angular movement between the ring and the body. The "locked" compression ring thereby prevents relative angular movement between the second end of the coil spring and the body.

14 Claims, 6 Drawing Sheets

OTHER PUBLICATIONS

PCT Notification of Transmittal of the International Search Report and the Written Opinion of the International Searching Authority, or the Declaration; International Search Report; Written Opinion of the International Searching Authority, dated Dec. 19, 2008 in PCT Application No. PCT/US2008/076155.

English translation of Austrian Patent 375,452 to Schleicher, Aug. 10, 1984.

English translation of French Patent Application 2,544,030 to Gresz et al, Oct. 12, 1984.

U.S. Appl. No. 11/872,163, filed Oct. 15, 2007, entitled "Stem-Mounted Tire Inflation Pressure Regulator".

U.S. Appl. No. 11/955,736, filed Dec. 13, 2007, entitled "Locking Threaded Connection".

* cited by examiner

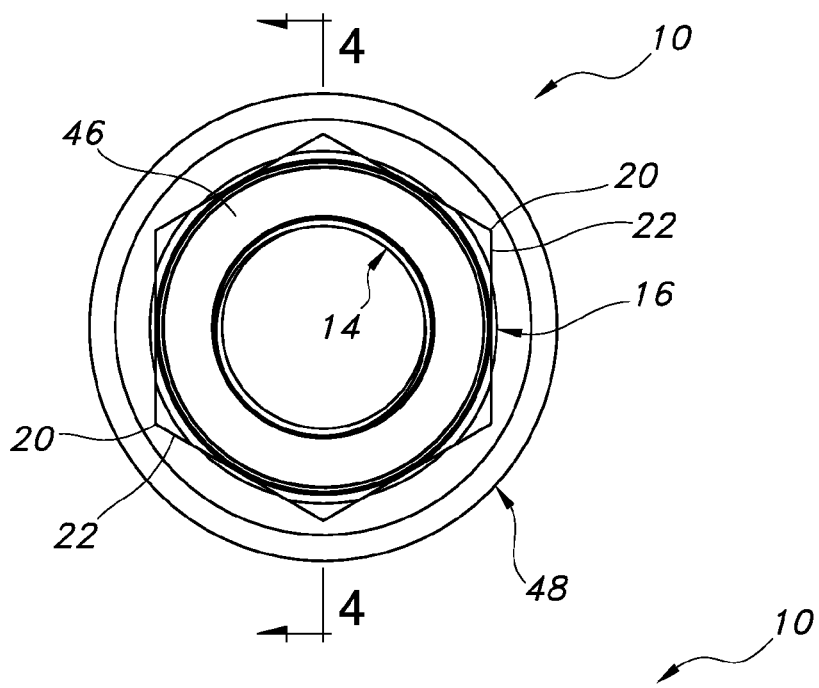
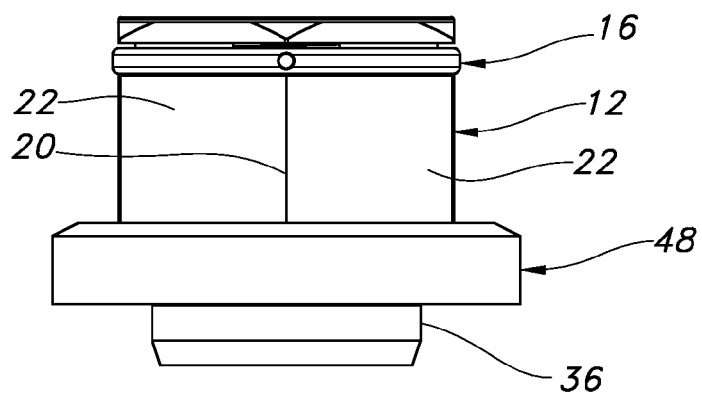
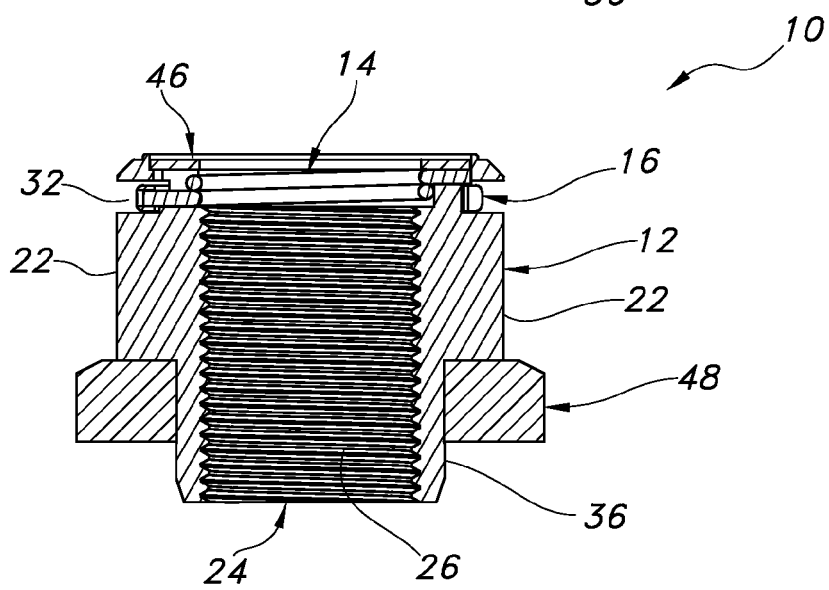

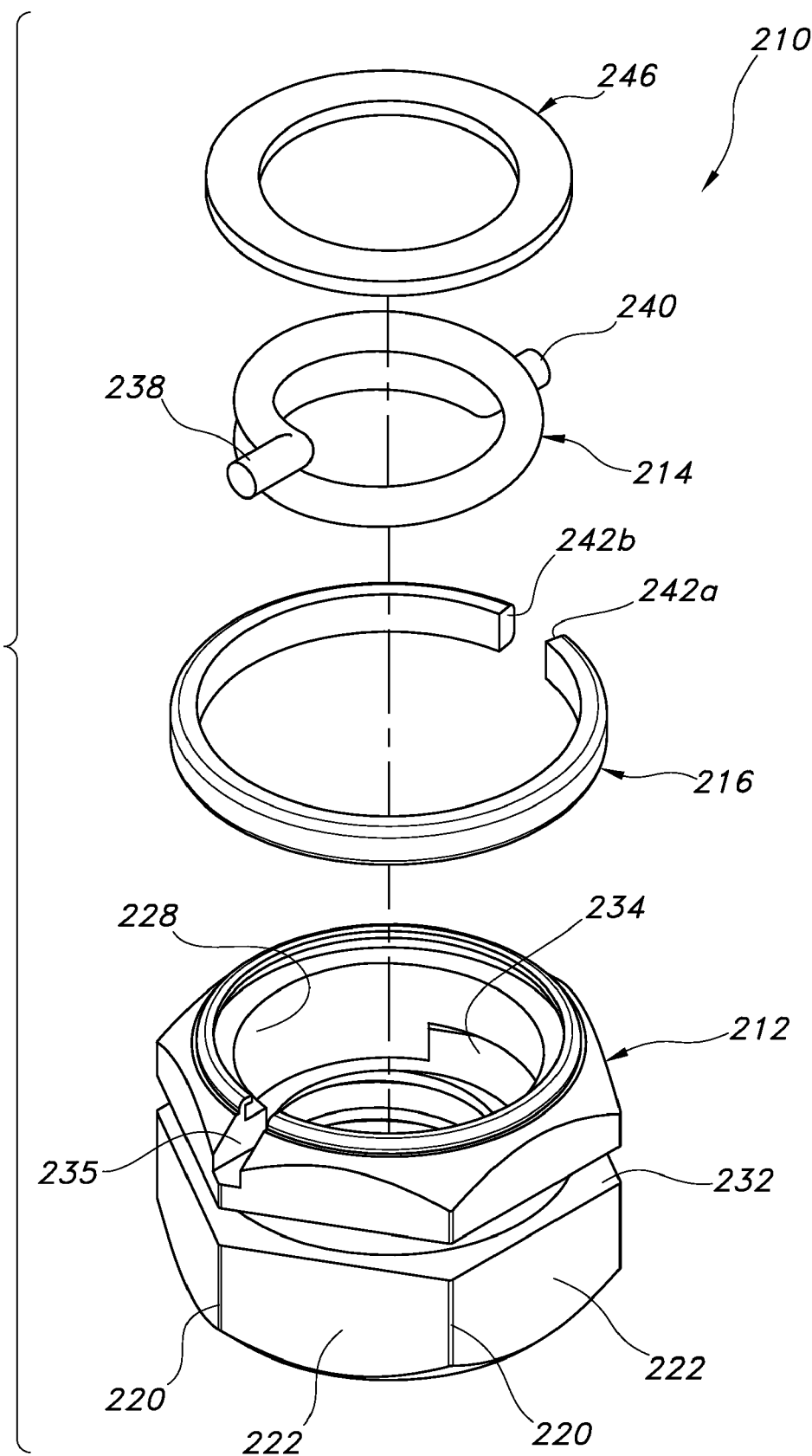

LOCKING THREADED FASTENER

BACKGROUND OF THE INVENTION

The present invention relates to locking fasteners, and more particularly to locking threaded fasteners that can be driven by conventional driving tools.

Locking threaded fasteners are generally known and widely used. For example, several particularly effective locking threaded fasteners are disclosed in application Ser. No. 11/955,736, filed Dec. 13, 2007 and entitled "Locking Threaded Connection", which is incorporated by reference into this patent application. While these fasteners are effective, an ever continuing need exists for fasteners with improved effectiveness and cost efficiency.

SUMMARY OF THE INVENTION

The present invention is directed to a locking threaded fastener of enhanced effectiveness and cost efficiency. The fastener includes a body, a coil spring, and a compression ring. The body defines a bore that is at least partially threaded, an externally opening circumferential groove, and a radially extending passage between the bore and the groove. The coil spring is located within the bore. The coil spring includes a first end angularly fixed with respect to the body and a second end extending through the radial passage and capable of angular movement with respect to the body. The compression ring is located within the circumferential groove. The ring defines an opening receiving the second end of the coil. Normally, the ring is free to move within the groove. However, the ring is adapted to be engaged by a conventional driving tool. When so engaged, the ring is angularly locked with respect to the body; and the locked ring angularly fixes the second coil end with respect to the body so that the fastener can be removed.

In the current embodiments, the compression ring opening can have various forms. For example, the compression ring can be a split ring having adjacent ends defining the opening. The compression ring also can define an aperture comprising the opening.

In the current embodiments, the body is hex-shaped, and at least portions of the compression ring extend outwardly beyond the flats of the hex-shape. Consequently, the compression ring is engaged in the areas of the flats when the driving tool is engaged with the body.

These and other advantages and features of the invention will be more fully understood and appreciated by reference to the description of the current embodiments and the drawings.

BRIEF DESCRIPTION OF THE DRAWINGS

FIG. 2 is a top plan view of the fastener;

FIG. 3 is a side elevation view of the fastener;

FIG. 4 is a section view taken along Line 4-4 in FIG. 2;

FIG. 5 is a perspective exploded view of a second embodiment of a locking threaded fastener;

DESCRIPTION OF THE CURRENT EMBODIMENTS

I. First Embodiment of the Fastener

Figure 1:
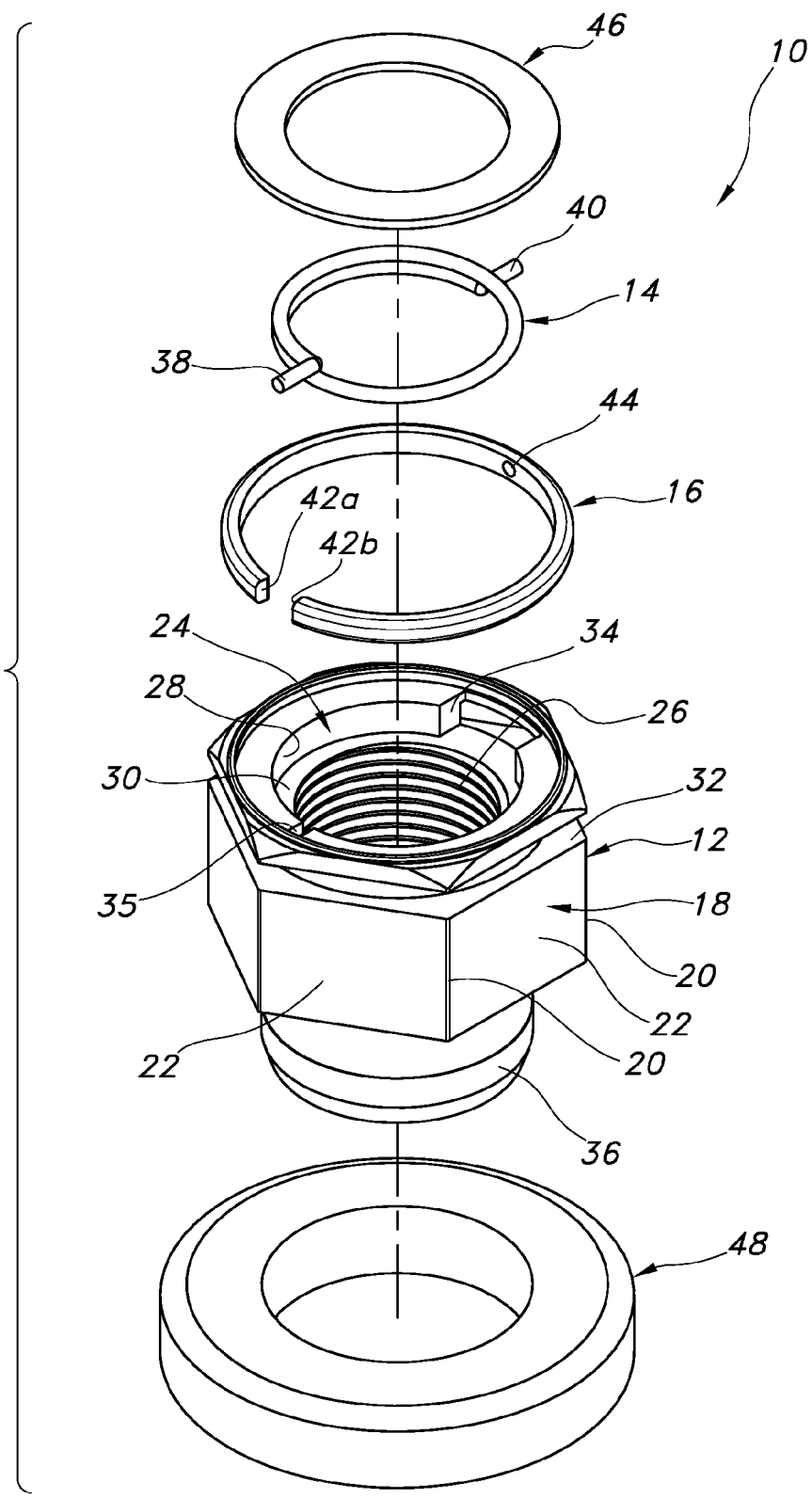
FIG. 1 is a perspective exploded view of a first embodiment of a locking threaded fastener.

A locking threaded fastener constructed in accordance with a first embodiment of the invention is illustrated in FIGS. 1-4 and generally designated 10. The fastener includes a body 12, a coil spring 14, and a compression ring 16. The coil spring 14 is located within the body 12 to provide a locking function. The compression ring 16 grips one end of the coil spring 14. The compression ring normally moves freely with respect to the fastener 12. However, the compression ring is automatically secured when the body is engaged by a conventional driving tool to prevent angular movement between the spring and the fastener body enabling the fastener to be unfastened.

The body 12 includes a hex-shaped portion 18 configured to be engaged and driven by a conventional driving tool (not shown). The hex portion 18 includes a plurality of corners 20 and a plurality of flats 22 extending therebetween. Alternatively, the body may be square or any other polygonal shape. The body may also be shaped to be engaged by any conventional driving tool, now known or later developed.

The body 12 includes a bore 24, which is at least partially threaded along its length. Specifically, a first portion 26 is threaded and a second portion 28 is unthreaded. The diameter of the second portion 28 is greater than the diameter of the threaded portion 26. A shoulder 30 (see FIG. 1) separates the two portions 26 and 28.

The fastener 12 also defines a circumferential groove 32 extending entirely around the fastener body. Alternatively, the groove may extend around less than the entire body. The groove 32 opens radially outwardly. The groove 32 in the current embodiment is square in cross section; however, a wide variety of shapes would be suitable.

The body 12 also defines a radial passage 34 extending between the bore 24 and the external groove 32. The passage has width in the angular direction to permit the movement of the spring as discussed below.

The body 12 also defines a slot 35 for receiving and radially securing a portion of the spring 14 as described below.

The body 12 also includes an extension portion 36 which is adapted for a particular application. The present invention is not restricted to any particular application, and accordingly the body 12 may have a wide variety of application-specific shapes and features.

The coil spring 14 is generally circular and includes a first end 38 terminating in a first tang and a second end 40 terminating in a second tang. The pitch of the spring 14 is generally similar to the pitch of the threaded portion 26 of the body 12. Consequently, the fastener may be installed on a externally threaded member (not shown) that is threadedly received by both the spring 14 and the threaded portion 26.

The first end 38 of the spring is received within the slot 35 in the body 12. Consequently, the first end 38 is angularly fixed with respect to the body 12 to prevent relative angular movement therebetween. The second end 40 of the spring 14 extends through the passage 34 and into the groove 32. The second end 40 is free to move angularly within the passage 34. The ring 16 is located within the second portion 28 of the bore 24.

The compression ring 16 fits about the body 12 and specifically within the groove 32. The compression ring is a split ring including a pair of adjacent ends 42a and 42b (see FIG. 1). The space between the ends 42a and b enables the ring 16 to be compressed within the groove. The ring 16 also defines a radially extending hole or aperture 44 closely receiving the second spring end 40. The second end 40 of the coil 14 is positioned within the aperture 44.

The ring 16 is dimensioned so that the ring extends radially beyond the flats 22 as perhaps best illustrated in FIG. 2. Consequently, the compression 16 is compressed by the corresponding flats of a conventional driving tool, such as a socket wrench, box wrench, or open-end wrench) when the driving tool is engaged with the fastener body 12.

A retainer 46 is press-fitted in the upper open end of the fastener body 12 to retain the coil spring 40 in position between the retainer and the shoulder 30.

A washer 48 is included for a particular application. The extension 36 of the body 12 is dimensioned to be closely received within the washer 48.

Normally, the compression ring 16 is free to move or rotate within the groove 32. Because of the engagement of the spring end 40, such movement will be relatively slight. However, such movement enables the fastener to be freely installed and tightened. Specifically, the coil spring 14 can flex open to permit the fastener to rotate in one direction— typically the tightening direction. However, the spring 14 prevents the fastener 10 from rotating in a second opposite direction—typically the loosening direction. The spring 14 also prevents inadvertent loosening due to vibration.

The fastener 10 can be easily rotated in the opposite direction (e.g. to be loosened or unthreaded) when the conventional driving tool engages the fastener body 12. Specifically, when the driving tool engages or fits over the fastening body 12, the driving tool engages the portions of the ring 16 that extend beyond the flats 22. The frictional contact between the driving tool and the ring 16 and/or the frictional contact between the compressed ring 16 and the fastener body 12 prevent the ring from moving angularly with respect to the body. Consequently, the ring 16 is angularly fixed whenever the driving tool is engaged. Because the second spring end 40 is captured within the aperture 44, the second spring end 40 is angularly fixed whenever the compression ring is annularly fixed. Consequently, the second spring end 40 cannot move to enable the spring to tighten around the externally threaded member when the driving tool is engaged. Consequently, the fastener 10 may be easily and intentionally unfastened by the driving tool.

II. Second Embodiment

Figure 6:
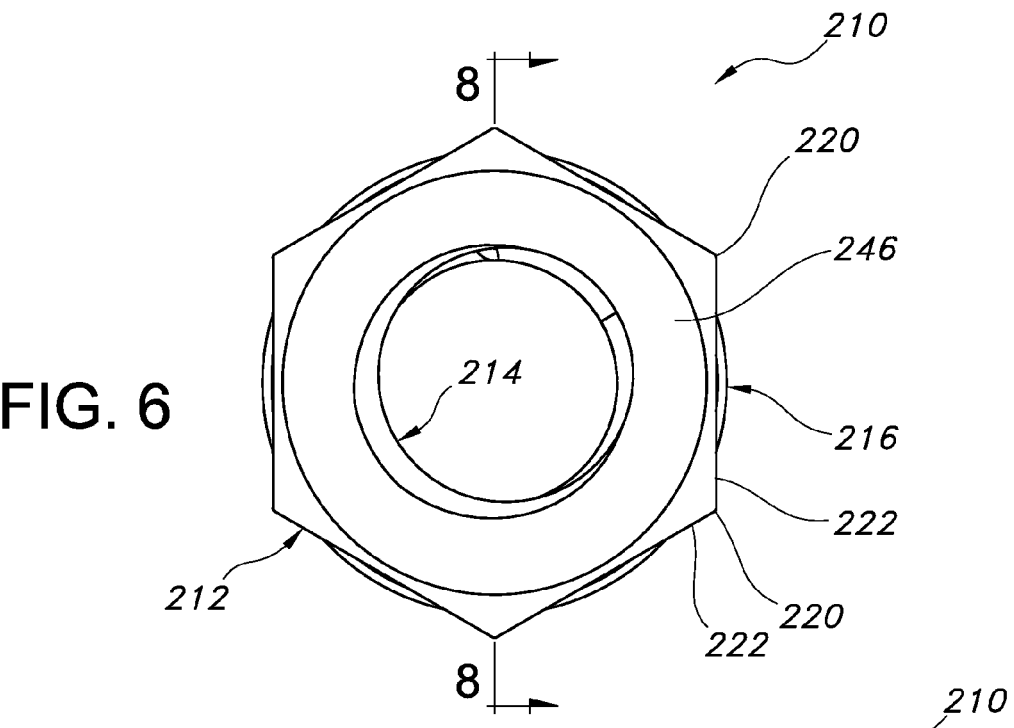
FIG. 6 is a top plan view of the fastener.
Figure 7:
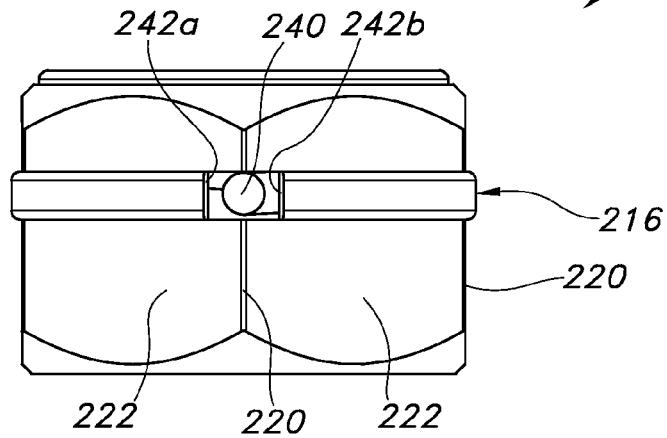
FIG. 7 is a side elevation view of the fastener.
Figure 8:
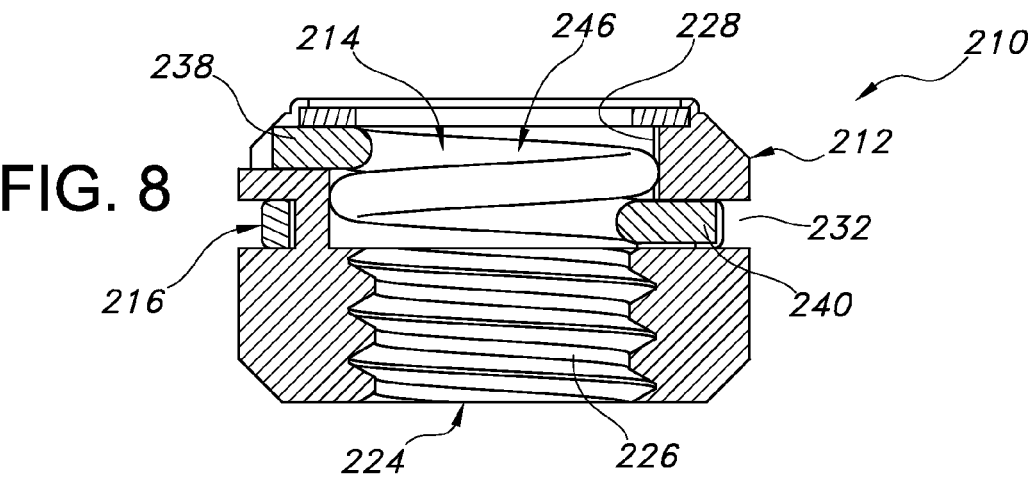
FIG. 8 is a section view taken along Line 8-8 in FIG. 6.
Figure 9:
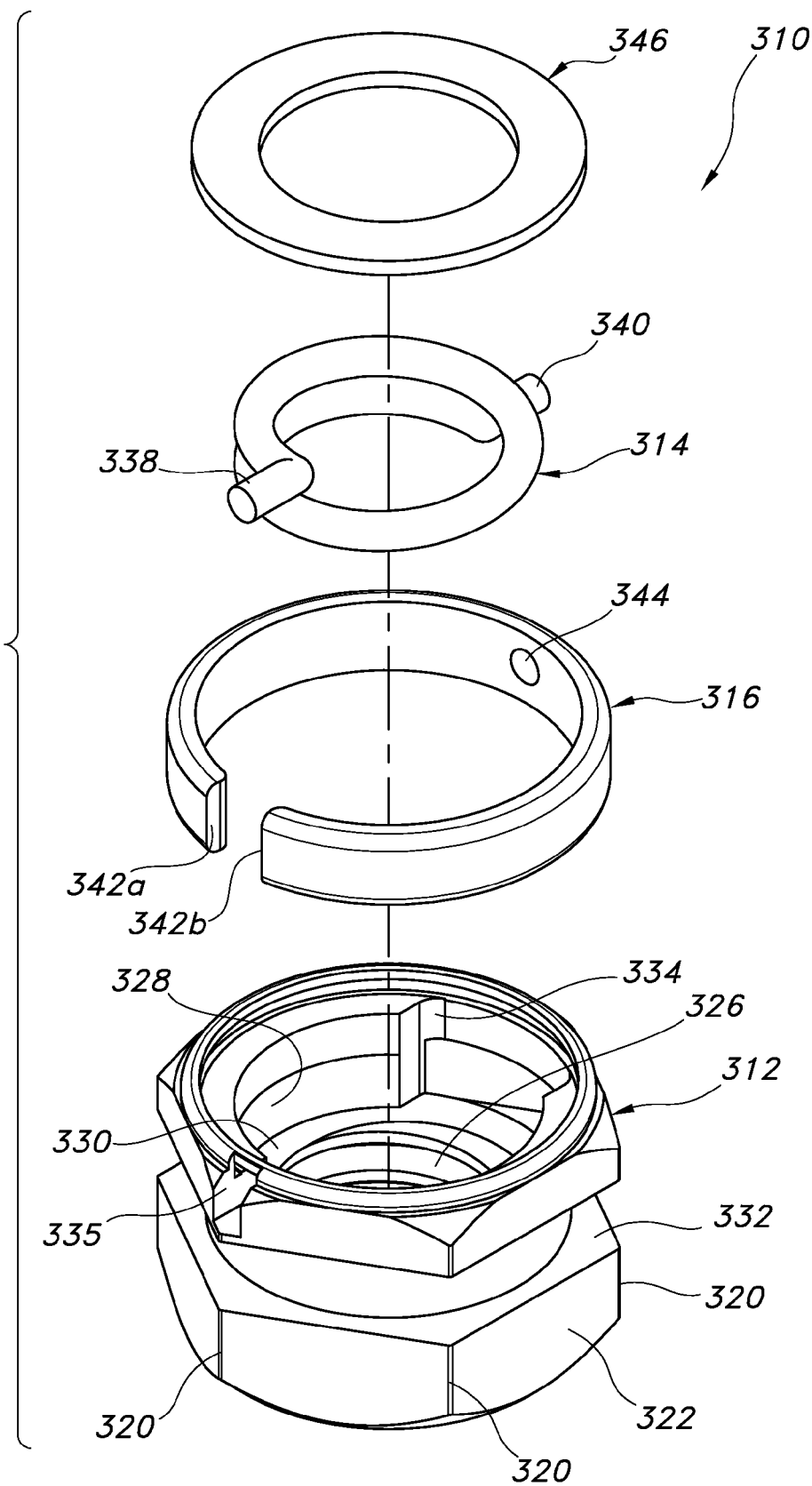
FIG. 9 is a perspective exploded view of a third embodiment of a locking threaded fastener.
Figure 10:
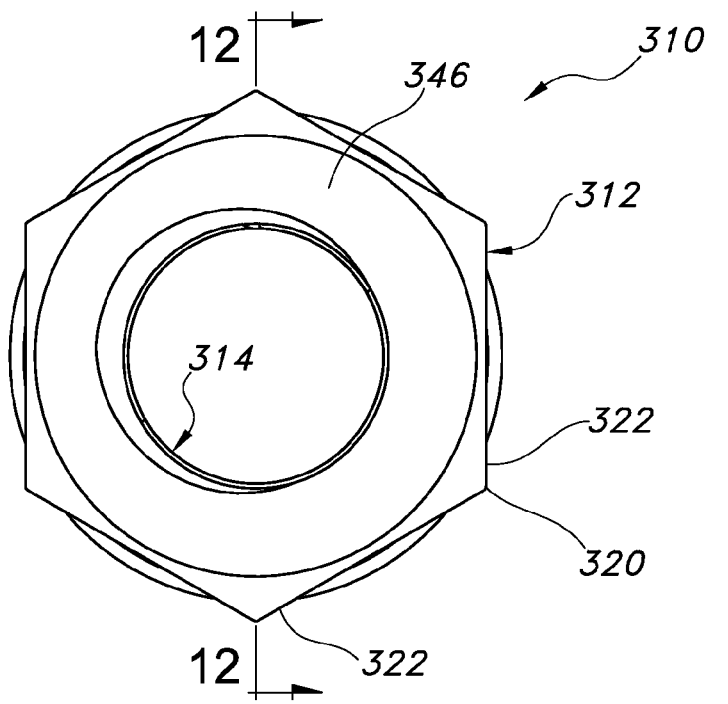
FIG. 10 is a top plan view of the fastener.
Figure 11:
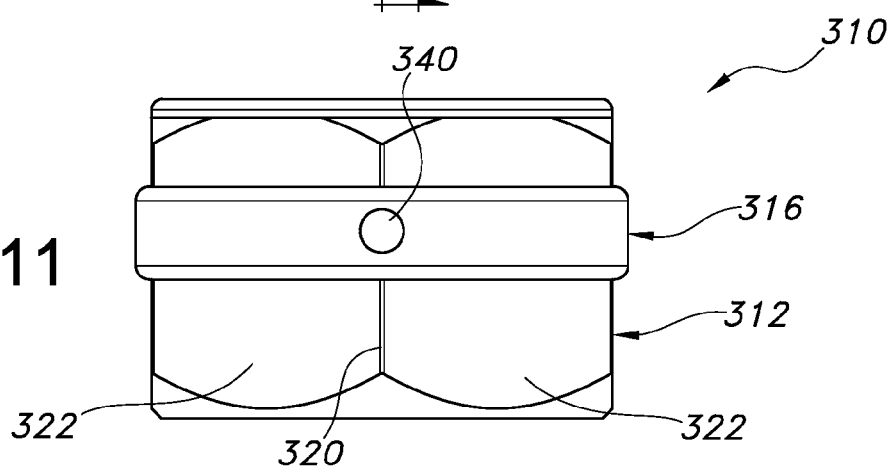
FIG. 11 is a side elevation view of the fastener.
Figure 12:
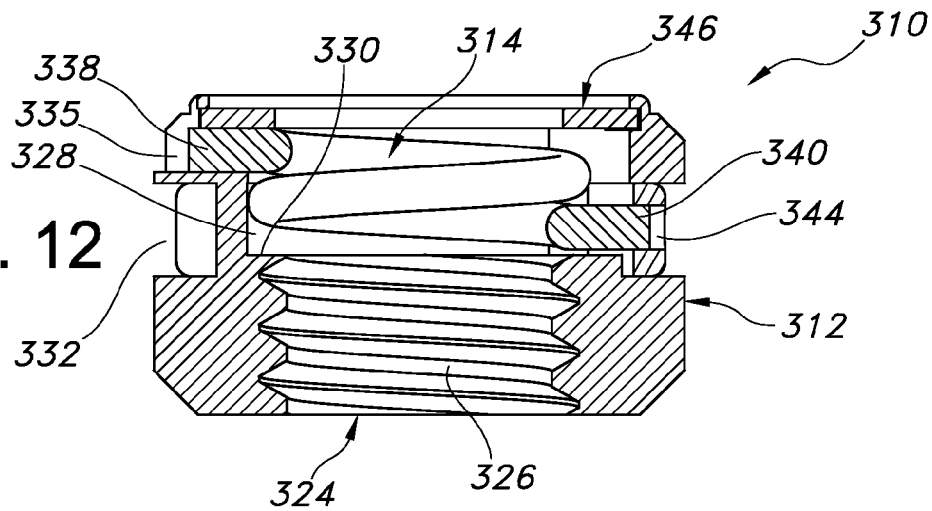
FIG. 12 is a section view taken along Line 12-12 in FIG. 10.

A locking threaded fastener constructed in accordance with a second embodiment of the invention is illustrated in FIGS. 5-8 and generally designated 210. The fastener 210 is structurally and functionally similar to the previously described fastener 10. Consequently, each element of the fastener 210 is identified by the same designating numeral as the corresponding element in the fastener 10 with the exception that the numeral begins with a 2. For example, spring 214 in the fastener 210 corresponds to spring 14 in the fastener 10. Only the elements that differ significantly are described below.

The fastener body 212 is generally similar to the previously described body 12 with the exceptions that it is physically configured for a different application. For example, the fastener 212 does not include the extension 36 of the fastener 10.

The coil spring 214 is essentially identical to the previously described coil spring 14. It may differ in physical configuration such as diameter, gauge, and pitch.

The compression ring 216 is somewhat different from the previously described compression ring 16. The compression ring 216 is a split ring having adjacent ends 242a and 242b. However, the compression ring 216 does not define a separate aperture.

As before, the retainer 246 is press-fit within the body 212 to retain the coil spring 214 in the body 212.

In the assembled fastener 210, the second end 240 of the spring 214 extends through the opening defined by the adjacent ends 242a and b. The first end 238 of the spring 214 is retained within the slot 235 to limit relative angular movement.

The operation of the fastener 214 is generally similar to the operation of the previously described fastener 10. The primary difference being that the second end 240 of the spring 214 is captured between the adjacent ends 242a and b of the coil spring 214 rather than within an aperture in the ring.

When a driving tool is not engaged with the fastener 210, the ring 216 is free to rotate within the groove 232. Consequently, the fastener may be readily installed and tightened on an externally threaded member (not shown). When the compression ring is engaged by the conventional driving tool, then movement between the ring and the body 212 is limited, and the angular movement of the second end 240 of the spring also is limited angularly. Consequently, the fastener when engaged by the driving tool can be readily unfastened and/or removed from the threaded member.

III. Third Embodiment

A locking threaded fastener constructed in accordance with a third embodiment of the invention is illustrated in FIGS. 5-8 and generally designated 310. The fastener 310 is structurally and functionally similar to the previously described fastener 10. Consequently, each element of the fastener 310 is identified by the same designating numeral as the corresponding element in the fastener 10 with the exception that the numeral begins with a 3. For example, spring 314 in the fastener 310 corresponds to spring 14 in the fastener 10. Only the elements that differ significantly are described below.

The fastener body 312 is generally similar to the previously described body 12 with the exceptions that it is physically configured for a different application. For example, the fastener 312 does not include the extension 36 of the fastener 10.

The coil spring 314 is essentially identical to the previously described coil spring 14. It may differ in physical configuration such as diameter, gauge, and pitch.

The compression ring 316 is generally similar to the previously described compression ring 16. The first end 338 of the spring 314 is received within the groove 335, and the second end 340 of the spring 314 is received within the aperture 344.

As before, the retainer 346 is press-fit within the body 312 to retain the coil spring 314 in the body 312.

The operation of the fastener 314 is generally similar to the operation of the previously described fastener 10. When a driving tool is not engaged with the fastener 310, the ring 316 is free to rotate within the groove 332. Consequently, the fastener may be readily installed and tightened on an externally threaded member (not shown). When the compression ring is engaged by the conventional driving tool, then movement between the ring and the body 312 is limited, and the angular movement of the second end 340 of the spring also is limited angularly. Consequently, the fastener when engaged by the driving tool can be readily unfastened and/or removed from the threaded member.

The above descriptions are those of current embodiments of the invention. Various alterations and changes can be made without departing from the spirit and broader aspects of the invention as defined in the claims, which are to be interpreted in accordance with the principles of patent law including the doctrine of equivalents.

The invention claimed is:

1. A locking threaded fastener comprising:
a body defining a bore having a threaded portion, the body adapted to be engaged and driven by a conventional driving tool, the body defining an externally opening groove and a passage extending between the bore and the groove;
a coil within the bore, the coil having a first end fixed angularly with respect to the body, the coil having a second end extending through the passage and into the groove; and
a split compression ring within the groove, the ring defining an opening receiving the second coil end, the ring capable of moving angularly within the groove when the driving tool is separate from the body, the ring being adapted to be compressed and fixed against angular movement within the groove when the driving tool is fitted over the body so that the ring limits angular movement of the second coil end with respect to the body.

2. A locking fastener as defined in claim 1 wherein the body includes corners and flats.

3. A locking fastener as defined in claim 2 wherein the ring extends outwardly beyond the flats when the driving tool is separate from the body.

4. A locking fastener as defined in claim 1 wherein the ring defines an aperture defining the opening.

5. A locking fastener as defined in claim 1 wherein the body defines a slot receiving the first end of the coil.

6. A locking fastener as defined in claim 1 wherein the coil comprises a coil spring.

7. A locking fastener comprising:
a body defining a bore having a threaded portion, the body adapted to be engaged and driven by a conventional driving tool, the body defining an externally opening groove and a passage extending between the bore and the groove;
a coil within the bore, the coil having a first end fixed angularly with respect to the body, the coil having a second end extending through the passage and into the groove; and
a ring within the groove, the ring defining an opening receiving the second spring end, the ring capable of moving within the groove when the driving tool is separate from the body, the ring being adapted to be fixed against movement within the groove when the driving tool is fitted over the body so that the ring limits angular movement of the second spring with respect to the body, the ring including two ends, the two ends defining the ring opening.

8. A locking threaded fastener comprising:
a body adapted to be driven by a conventional driving tool, the body defining a bore having first and second portions, the first portion having a first diameter and being internally threaded, the second portion having a second diameter larger than said first diameter, the body defining an outwardly opening circumferential groove extending entirely around the body, the body defining a radially oriented passage extending between the second portion of the bore and the circumferential groove;
a coil spring within the second portion of the bore, the coil having a first end secured against angular movement with respect to the fastener body, the coil having a second end extending through the passage and into the circumferential groove, the second end having a range of radial movement within the passage with respect to the fastener body; and
a split compression ring within the circumferential groove and defining an opening, the second end of the coil extending into the opening, the ring being free to move angularly within the circumferential groove about the body, the ring adapted to be compressed by a conventional driving tool when the tool is engaged with the body to prevent relative angular movement of the ring with respect to the tool and the fastener body so that the second end of the coil is held in fixed angular relationship to the fastener body.

9. A locking fastener as defined in claim 8 wherein the body includes corners and flats.

10. A locking fastener as defined in claim 9 wherein the compression ring includes portions extending radially outwardly beyond the flats.

11. A locking fastener as defined in claim 8 wherein the ring defines an aperture defining the opening.

12. A locking fastener as defined in claim 8 wherein:
the body defines a slot; and
the first end of the coil spring extends into the slot.

13. A locking fastener comprising:
a body adapted to be driven by a conventional driving tool, the body defining a bore having first and second portions, the first portion having a first diameter and being internally threaded, the second portion having a second diameter larger than said first diameter, the body defining an outwardly opening circumferential groove extending entirely around the body, the body defining a radially oriented passage extending between the second portion of the bore and the circumferential groove;
a coil spring within the second portion of the bore, the coil having a first end secured against angular movement with respect to the fastener body, the coil having a second end extending through the passage and into the circumferential groove, the second end having a range of radial movement within the passage with respect to the fastener body; and
a compression ring within the circumferential groove and defining an opening, the second end of the coil extending into the opening, the ring being free to move within the circumferential groove about the body, the ring adapted to be compressed by a conventional driving tool when the tool is engaged with the body to prevent relative movement of the ring with respect to the tool and the fastener body so that the second end of the coil is held in fixed angular relationship to the fastener body, the compression ring being split having two adjacent ends, the two adjacent ends defining the opening.

14. A locking fastener comprising:
a body adapted to be driven by a conventional driving tool, the body defining a bore having first and second portions, the first portion having a first diameter and being internally threaded, the second portion having a second diameter larger than said first diameter, the body defining an outwardly opening circumferential groove extending entirely around the body, the body defining a radially oriented passage extending between the second portion of the bore and the circumferential groove;
a coil spring within the second portion of the bore, the coil having a first end secured against angular movement with respect to the fastener body, the coil having a second end extending through the passage and into the circumferential groove, the second end having a range of radial movement within the passage with respect to the fastener body; and a compression ring within the circumferential groove and defining an opening, the second end of the coil extending into the opening, the ring being free to move within the circumferential groove about the body, the ring adapted to be compressed by a conventional driving tool when the tool is engaged with the body to prevent relative movement of the ring with respect to the tool and the fastener body so that the second end of the coil is held in fixed angular relationship to the fastener body, the compression ring defining an aperture defining the opening, the compression ring being split having two adjacent ends, the first end of the coil spring extending between the two adjacent ends.

* * * * *